(12) United States Patent
Kato et al.

(10) Patent No.: US 6,753,640 B2
(45) Date of Patent: Jun. 22, 2004

(54) PIEZOELECTRIC DRIVEN TYPE VIBRATORY FEEDER

(75) Inventors: Kazumichi Kato, Ise (JP); Takayoshi Fujii, Ise (JP); Nobuhiro Saito, Ise (JP); Yuushi Sato, Ise (JP); Tetsuyuki Kimura, Ise (JP); Yasushi Muragishi, Ise (JP)

(73) Assignee: Shinko Electric Co., Ltd., Tokyo (JP)

( * ) Notice: Subject to any disclaimer, the term of this patent is extended or adjusted under 35 U.S.C. 154(b) by 198 days.

(21) Appl. No.: 10/115,239

(22) Filed: Apr. 4, 2002

(65) Prior Publication Data

US 2002/0171330 A1 Nov. 21, 2002

(30) Foreign Application Priority Data

Apr. 6, 2001 (JP) ........................................ 2001-109089
Apr. 9, 2001 (JP) ........................................ 2001-109372

(51) Int. Cl.[7] ............................................. H01L 41/08
(52) U.S. Cl. ...................... 310/310; 328/310; 328/331
(58) Field of Search ........................ 310/328, 330–331, 310/323.01

(56) References Cited

U.S. PATENT DOCUMENTS 5,008,580 A * 4/1991 Masuda et al. ............. 310/321

FOREIGN PATENT DOCUMENTS

JP 2-51806 11/1990
JP 2762211 3/1998

* cited by examiner

Primary Examiner—Mark Budd
(74) Attorney, Agent, or Firm—Oblon, Spivak, McClelland, Maier & Neustadt, P.C.

(57) ABSTRACT

A piezoelectric driven type vibratory feeder having a working mass member that vibrates stably over an entire area of the working mass member is disclosed. The piezoelectric driven type vibratory feeder includes a base, a plurality of first plate springs, with a lower end portion of each of the plurality of first plate springs being secured to the base. A working mass member connected to an upper end portion of each of the plurality of first plate springs and supported at the base to enable the working mass member to vibrate. The piezoelectric feeder also includes a plurality of second plate springs, a piezoelectric device bonded to at least one surface of each of the plurality of second plate springs. An alternating voltage is applied to each piezoelectric device whereby each second plate spring undergoes bending vibration and causes the working mass member to vibrate so that an object is transported on the working mass member.

15 Claims, 14 Drawing Sheets

PIEZOELECTRIC DRIVEN TYPE VIBRATORY FEEDER

BACKGROUND OF THE INVENTION

1. Field of the Invention

The present invention relates to a piezoelectric driven type vibratory feeder.

2. Description of the Related Art

As a first example of a piezoelectric driven type vibratory feeder, a device, such as that illustrated in FIG. 15, is disclosed in Japanese Patent No. 2762211. A transporting member 5 (term used in the specification, and will be used below) is supported by transporting member supporting members 8, which are a pair of front and back vertical spring steel members. The lower end portions of the transporting member supporting members 8 are secured to a base 3. The heights of the front and back portions of the base 3 are different. In other words, the base 3 has a trapezoidal shape. Therefore, the spring operating lengths of the transporting member supporting members 8 differ at the front and back sides of the base 3. A pair of front and back vibration members 9 are secured to the bottom surface of the transporting member 5, and comprise corresponding piezoelectric devices 1 bonded to both surfaces of corresponding elastic plates 2. Accordingly, the piezoelectric driven type vibratory feeder has what is called a bimorph structure. Mass members 7 and 7 having different masses are mounted to the lower ends of the corresponding elastic plates 2. Transportation parts 6 are to be transported on the transporting member 5 in the direction of an arrow. When an alternating voltage is applied to the piezoelectric devices 1, the piezoelectric devices 1 bonded to both surfaces of their corresponding elastic plates 2 expand and contract. By the expansion and contraction of the piezoelectric devices 1, the transporting member 5 vibrates in an oblique direction, so that the transportation parts 6 are, as conventionally known, transported in the direction of the arrow.

In such a piezoelectric driven type vibratory feeder, however, since the mass members 7 and 7 are secured to the lower ends of their corresponding elastic plates 2, and the transporting member 5 is secured to the bases of the elastic plates 2, rotational motion occurs around the secured points as indicated by the double-headed arrows. This causes rotational motion of the transporting member 5, which may be very complicated. In addition, a common alternating voltage is applied. Therefore, since the masses of the mass members 7 and 7 are different, even if the spring constants of the elastic plates 2 are the same, the resonant frequencies of these two vibratory systems are different. Consequently, the amplitudes of the mass members 7 and 7 are different, and, with regard to their vibration displacements, the alternating voltages applied to the mass members 7 and 7 are out of phase. Thus, the transporting member 5 may vibrate in a more complicated manner, so that a smooth transportation operation may not be performed over the entire transporting member 5.

FIG. 16 illustrates a second conventional example of a piezoelectric driven type vibratory feeder disclosed in Japanese Patent Examined Publication HEI02-50806 B2. By bolts b, ends of an obliquely provided pair of front and back plate springs 13a and 13b are secured, one at each end of a plate-spring-mounting block 12 secured to the bottom surface of a trough 11. By corresponding plate-spring-mounting blocks 14a and 14b, the bottom end portions of the plate springs 13a and 13b are secured to the top ends of their corresponding piezoelectric-device-mounting plate springs 15a and 15b disposed below the plate springs 13a and 13b. The bottom end portions of the piezoelectric-device-mounting plate springs 15a and 15b are secured to a base 17. Piezoelectric devices 16a and 16a' and piezoelectric devices 16b and 16b' are bonded to both surfaces of the plate springs 15a and 15b, respectively. Alternating voltages are applied to the piezoelectric devices 16a and 16a' and the piezoelectric devices 16b and 16b', so that the plate springs 15a and 15b bend. The trough 11 amplifies vibration by the upper plate springs 13a and 13b. Even in this conventional example, a vibration-proof structure is not provided. Therefore, from the bottom end portions of the lower plate springs 15a and 15b, a reaction force resulting from the vibration of the tough 11 or a bending reaction force of the plate springs 15a and 15b is directly transmitted to the base 17, so that, not only are other similar vibration mechanisms mounted to a common installation base Q adversely affected, but also noise is produced by a reaction force that is transmitted through the floor. In order to overcome these problems, a vibration-proof structure, such as that shown in FIG. 17, can be provided. In FIG. 17, corresponding parts to those shown in FIG. 16 are given the same reference numerals, and are not described in detail below. In the piezoelectric driven type vibratory feeder having the vibration-proof structure, a vibration-proof block 18 is mounted below the base 17, and is joined to an installation base 19 by a pair of front and back vibration-proof springs 20a and 20b having small spring constants. By this structure, the vibration reaction force transmitted to the base 17 is virtually not transmitted to the installation base 19 due to deflection of the vibration-proof springs 20a and 20b. In such a structure, however, the height of the entire piezoelectric driven type vibratory feeder becomes large. Therefore, a problem concerning the relationship with other devices disposed near the piezoelectric driven type vibratory feeder for proper arrangement therewith and a problem of a lack of stability of the piezoelectric driven type vibratory feeder arise.

SUMMARY OF THE INVENTION

In view of the above-described problems, it is an object of the present invention to provide a piezoelectric driven type vibratory feeder whose working mass member vibrates stably over the entire area of the working mass member and which can prevent a reaction force from being transmitted to an installation base or a base without increasing the height of the entire piezoelectric driven type vibratory feeder.

To this end, according to a basic form of the present invention, there is provided a piezoelectric driven type vibratory feeder comprising a base; a plurality of first plate springs, with a lower end portion of each of the plurality of first plate springs being secured to the base; a working mass member connected to an upper end portion of each of the plurality of first plate springs, and supported at the base so that the working mass member can vibrate; a plurality of second plate springs, with an upper end portion of each of the plurality of second plate springs being secured to the working mass member; a single opposing mass member, with a lower end portion of each of the plurality of second plate springs being connected to the single opposing mass member; a piezoelectric device bonded to at least one surface of each of the plurality of second plate springs; and alternating voltage applying means for applying alternating voltage to each piezoelectric device. In the piezoelectric driven type vibratory feeder, by applying the alternating voltage to each piezoelectric device, each of the plurality of second plate springs undergoes bending vibration, causing the working mass member to vibrate by the bending vibration, so that an object is transported on the working mass member.

By virtue of the above-described structure, it is possible to prevent a reaction force from being transmitted to the base without increasing the height of the entire vibratory feeder. In addition, it is possible to smoothly transport an object to be transported by uniformly and stably vibrating the working mass member without producing rotational motion that results in perturbation.

When the structure of the basic form is used, a total spring constant of the first plate springs may be sufficiently smaller than a total spring constant of the second plate springs, and each first plate spring may act as a vibration-proof spring.

When the structure of the basic form is used, each second plate spring may be disposed substantially perpendicular to an object transportation surface of the working mass member.

When the structure of the basic form is used, each first plate spring may be disposed so as to be tilted at a predetermined angle from a direction in which the object is transported.

When the structure of the basic form is used, the piezoelectric driven type vibratory feeder may further comprise vibration detecting means for detecting any one of vibration displacement, velocity, and acceleration of either the working mass member or the opposing mass member; and alternating frequency controlling means for controlling a frequency of the alternating voltage applied to each piezoelectric device so that the working mass member undergoes resonant vibration at a natural frequency determined by masses of the working mass member and the opposing mass member and a spring constant of the second plate springs. By this, it is possible to ensure realization of a resonance condition. The vibration detecting means may be a proximity sensor disposed near one of the first plate springs or one of the second plate springs.

When the structure of the basic form is used, each of the plurality of first plate springs and each of the plurality of second plate springs may form a pair of front and back plate springs. When each of the plurality of first plate springs and each of the plurality of second plate springs form a pair of front and back plate springs, the working mass member may be a linear trough.

When the structure of the basic form is used, the plurality of first plate springs may be disposed at equiangular intervals, the plurality of second plate springs may be disposed at equiangular intervals, the working mass member may be supported so as to be capable of undergoing torsional vibration, and, by the torsional vibration of the working mass member, the object may be transported on the working mass member. When the plurality of first plate springs are disposed at equiangular intervals, the plurality of second plate springs are disposed at equiangular intervals, the working mass member is supported so as to be capable of undergoing torsional vibration, and, by the torsional vibration of the working mass member, the object is transported on the working mass member, the working mass member may be a bowl-shaped container with a spiral track.

When the structure of the basic form is used, each second plate spring may have a shape formed by bending a portion thereof substantially perpendicularly, and each second plate spring may include a substantially vertical portion and a substantially parallel portion with respect to an object transportation surface of the working mass member, with each substantially parallel portion being secured to a bottom surface of the working mass member. According to such a structure, since each substantially parallel portion is also deformed by being deflected and acts as an effective portion of its corresponding plate spring, the effective length of each second plate spring is increased. By this, it is possible to increase the displacement of each second plate spring, and to increase transportation capability of the feeder without increasing the height of the feeder. Here, to the extent allowed by its relationship with each member in the vicinity thereof, it is preferable to make the ratio of the length of each substantially horizontal portion to the length of each substantially vertical portion large. As this ratio becomes large, the effective length of each second plate spring is increased, and the spring constant of each second plate spring becomes small. Therefore, it is easier for each second plate spring to be displaced by a large amount.

When each second plate spring has a shape formed by bending a portion thereof substantially perpendicularly, and each second plate spring includes a substantially vertical portion and a substantially parallel portion with respect to an object transportation surface of the working mass member, with each substantially parallel portion being secured to a bottom surface of the working mass member, each piezoelectric device may be bonded to only a side opposite to the working mass member with respect to an inflection point of each second plate spring. When the effective length of each second plate spring becomes large, the inflection point of each second plate spring is displaced towards the working mass member from the center of its substantially vertical portion. Therefore, the proportion of a portion to which each piezoelectric device can be bonded becomes large.

When each second plate spring has a shape formed by bending a portion thereof substantially perpendicularly, and each second plate spring includes a substantially vertical portion and a substantially parallel portion with respect to an object transportation surface of the working mass member, with each substantially parallel portion being secured to a bottom surface of the working mass member, the piezoelectric driven type vibratory feeder may further comprise spring constant adjusting means for adjusting a spring constant of each second plate spring. When the piezoelectric driven type vibratory feeder further comprises spring constant adjusting means for adjusting a spring constant of each second plate spring, the spring constant adjusting means may comprise a spacer and a spring presser plate, and may change an effective length of each second plate spring at at least one of a working-mass-member side and an opposing-mass-member side. When the piezoelectric driven type vibratory feeder further comprises spring constant adjusting means for adjusting a spring constant of each second plate spring, the spring constant adjusting means may be constructed so as to make variable a position of securing the opposing mass member to each second plate spring by a slot formed in an end portion of each second plate spring.

BRIEF DESCRIPTION OF THE DRAWINGS

FIG. 5A illustrates a vibratory system model used in the first embodiment of the present invention, and FIG. 5B illustrates a vibratory system model used in the second conventional example.

FIG. 6A is a graph showing the transfer function of frequency versus trough amplitude, and FIG. 6B is a graph showing the transfer function of floor reaction force versus frequency.

DESCRIPTION OF THE PREFERRED EMBODIMENTS

Hereunder, a description of a first embodiment of the present invention will be given with reference to FIG. 1.

Figure 1:
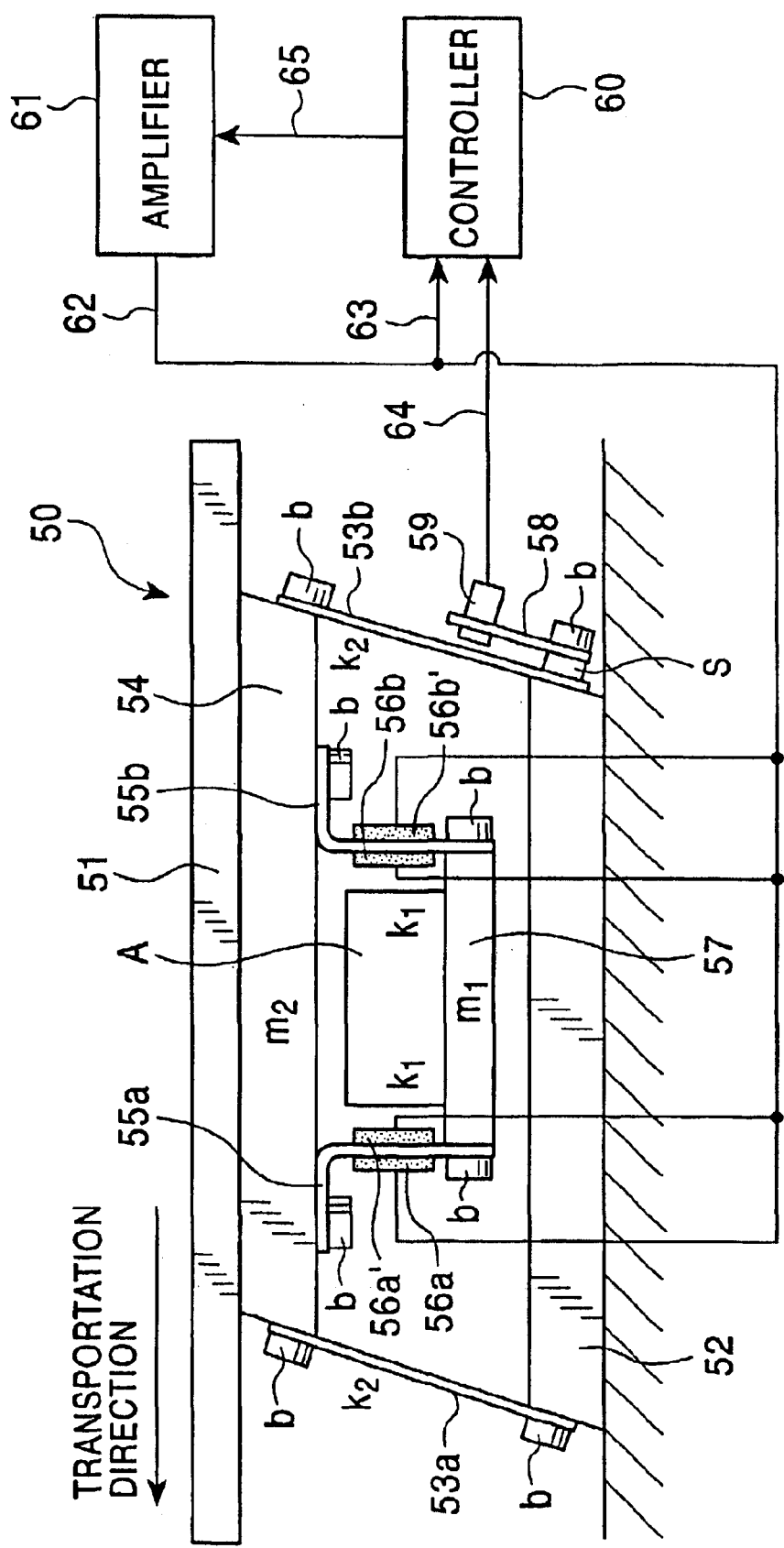
FIG. 1 is a front view schematically showing a piezoelectric driven type vibratory feeder of a first embodiment of the present invention.

In a piezoelectric driven type vibratory feeder 50 shown in FIG. 1, a trough 51 is joined to a base 52 by an obliquely provided pair of front and back plate springs 53a and 53b. The top end portions of the plate springs 53a and 53b are secured to a plate-spring-mounting block 54 integrally provided with the trough 51. The trough 51 is supported so that it can vibrate substantially vertically with respect to the longitudinal directions of these plate springs 53a and 53b through the plate-spring-mounting block 54.

A pair of substantially inverted L-shaped plate springs 55a and 55b are secured to the bottom surface of the plate-spring-mounting block 54 by bolts b. Piezoelectric devices 56a and 56a' are bonded, one to each surface of the plate spring 55a. Piezoelectric devices 56b and 56b' are bonded, one to each surface of the plate spring 55b. According to the present invention, a common opposing mass member 57 is secured to the lower end portions of the pair of plate springs 55a and 55b by bolts b. Through an electrical wire path 62, alternating voltage from an amplifier circuit 61 is applied to each of the piezoelectric devices 56a and 56a' and to each of the piezoelectric devices 56b and 56b' as a result of phase inversion by 180 degrees at both surfaces. A proximity sensor 59 is mounted to an end portion of a sensor-mounting plate 58 so as to oppose the lower end portion of the back plate spring 53b. The lower end portion of the back plate spring 53b is secured to the base 52 by a bolt b through a spacer s by interposing the plate spring 53b between the spacer s and the base 52. A detection output from the proximity sensor 59 is supplied to a control circuit 60 through an electrical wire path 64. In addition, an output from the amplifier circuit 61 is supplied to the control circuit 60 through an electrical wire path 63.

Figure 7:
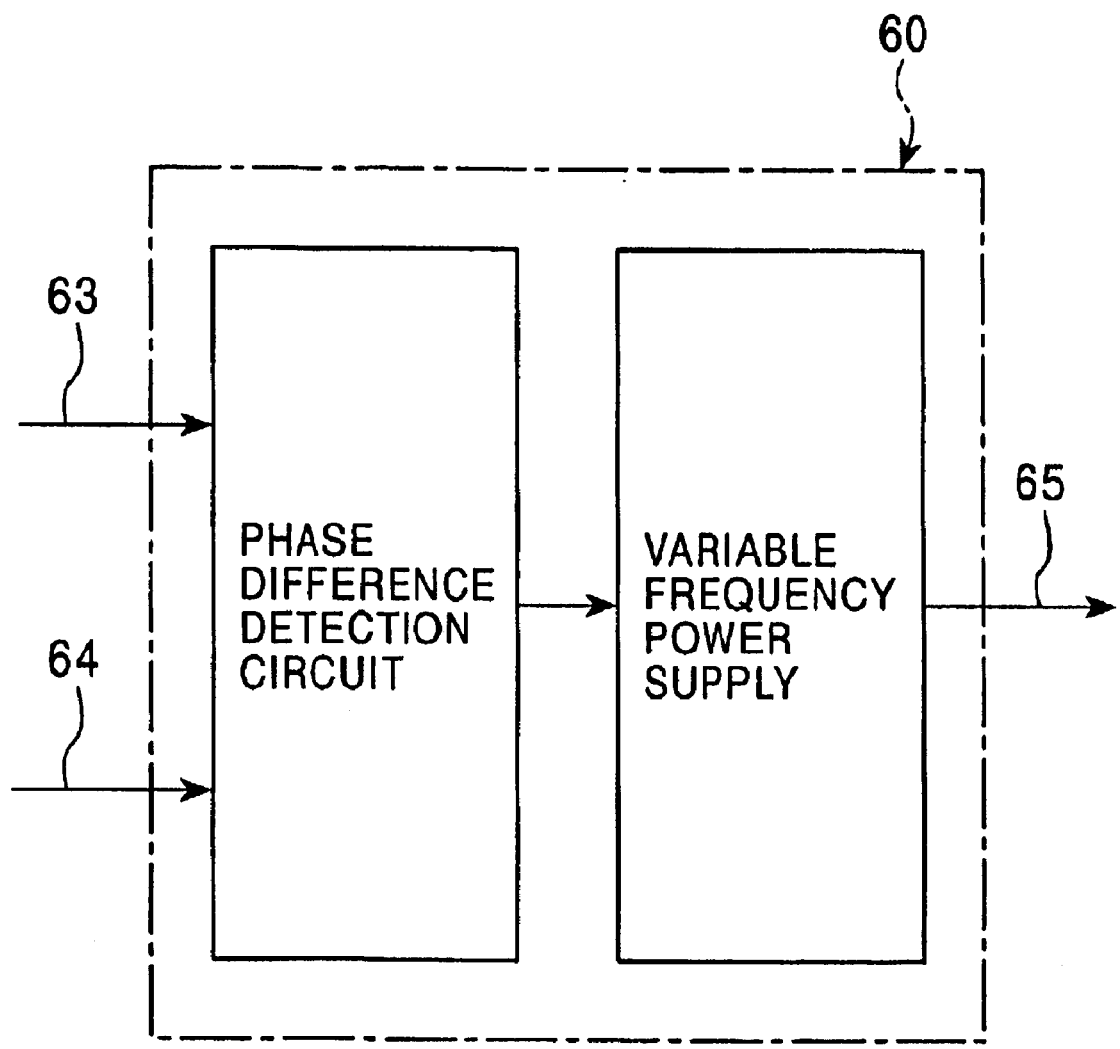
FIG. 7 is a block diagram of a control circuit 60 shown in FIG. 1.

The controller 60 primarily includes a phase detection circuit and a variable frequency power supply as shown in FIG. 7. The detection output of the aforementioned proximity sensor 59 is supplied to one input terminal of the phase detection circuit, and the output from the amplifier 61 is supplied to the other input terminal of the phase detection circuit. Based on a phase detection output of the phase difference detection circuit, the frequency of the variable frequency power supply is adjusted. This output is amplified by the amplifier circuit 61, and the amplified output is supplied to the piezoelectric devices 56a and 56a' and the piezoelectric devices 56b and 56b'. From the viewpoint of vibration engineering, as is clear, when the phase difference between vibration displacement and force, that is, the applied alternating voltage is 90 degrees, the vibratory systems are in resonance conditions.

The description of the structure of the first embodiment of the present invention has been given above. Next, a description of the operation of the piezoelectric driven type vibratory feeder will be given.

Alternating voltage from the amplifier 61 is applied to the piezoelectric devices 56a and 56a' bonded to the plate spring 55a and to the piezoelectric devices 56b and 56b' bonded to the plate spring 55b. By this, the plate springs 55a and 55b undergo bending vibration, causing the common opposing mass member 57 to vibrate in a direction opposite to the trough 51. Since the pair of front and back plate springs 53a and 53b are obliquely disposed, the trough 51 vibrates in a direction substantially perpendicular to the obliquely disposed plate springs 53a and 53b, so that objects to be transported (not shown) are smoothly transported toward the left in FIG. 1 on the trough 51. Since the opposing mass member 57 is interposed between the lower end portions of the plate springs 55a and 55b and secured to them by the bolts b, a force that rotates the trough 51 produced in the conventional piezoelectric driven type vibratory feeders is not produced. The trough 51 is restricted in the tilt direction of the plate springs 53a and 53b, so that the entire area of the trough 51 vibrates in a direction substantially perpendicular to the tilt direction.

Figure 5A:
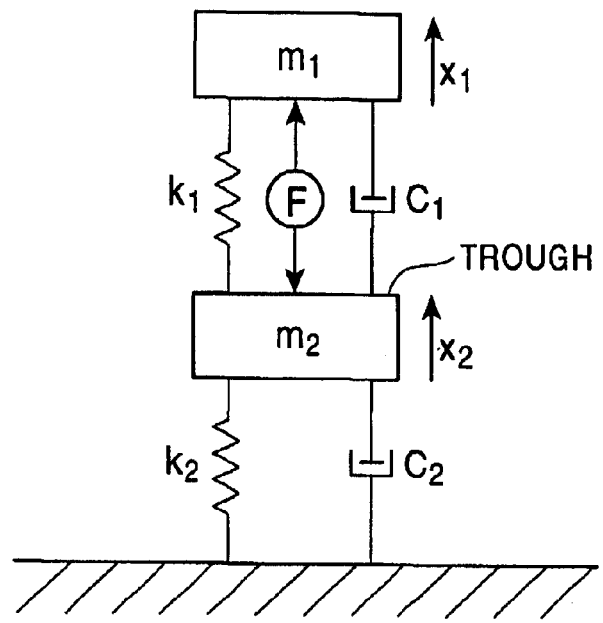
FIGS. 5A and 5B illustrate vibratory system models. More specifically.

FIG. 5A illustrates a vibratory system model used in the embodiment of the present invention. $m_1$ denotes the mass of the opposing mass member 57, $m_2$ denotes the mass of the trough 51 (which includes the mass of the plate-spring-mounting block 54), $k_1$ denotes the total spring constant of the plate springs 55a and 55b connecting the opposing mass member 57 and the trough 51, $k_2$ denotes the total spring constant of the plate springs 53a and 53b supporting the trough 51 on the base 52 so that the trough 51 can vibrate, $c_1$ and $c_2$ denote the viscosity coefficients between the opposing mass member 57 and the trough 51 and between the trough 51 and the base 52, respectively, and F denotes an actuator that operates between the opposing mass member 57 and the trough 51, that is, the piezoelectric devices 56a, 56a', 56b, and 56b' to which alternating voltage is applied.

Figure 5B:
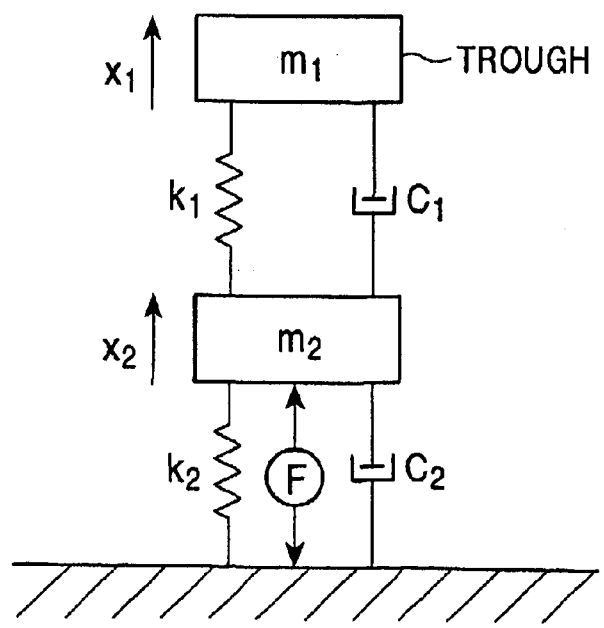
Figure 16:
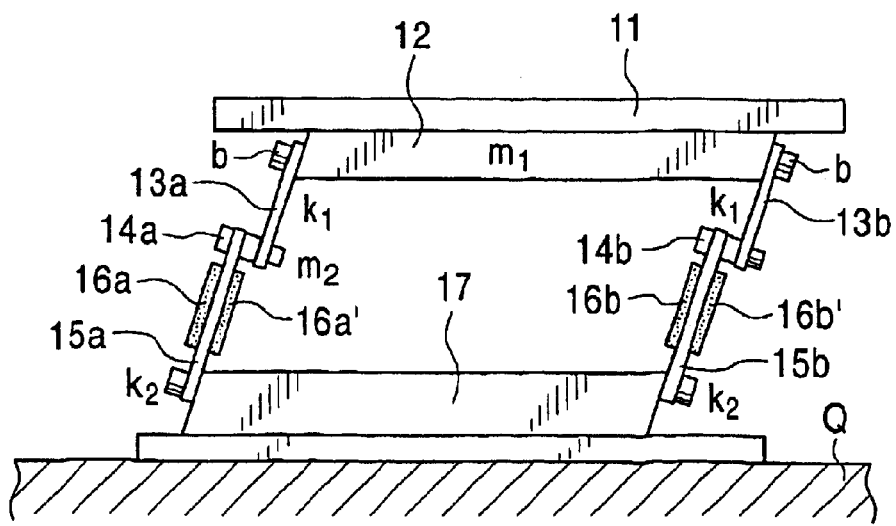
FIG. 16 is a front view schematically showing a second conventional example of a piezoelectric driven type vibratory feeder.

FIG. 5B illustrates a vibratory system model used in the second conventional example of the piezoelectric driven type vibratory feeder (shown in FIG. 16). $m_1$ denotes the mass of the trough 11 being a working mass member (including the mass of the plate-spring-mounting block 12), $m_2$ denotes the total mass of the plate-spring-mounting blocks 14a and 14b, $k_1$ denotes the total spring constant of the auxiliary plate springs 13a and 13b, $k_2$ denotes the total spring constant of the driving plate springs 15a and 15b, $c_1$ and $c_2$ denote the viscosity coefficients between the masses $m_1$ and $m_2$ and between the mass $m_2$ and the base 17, respectively, and F denotes an actuator operating between the plate-spring-mounting blocks 14a and 14b (mass $m_2$) and the base 17, that is, the piezoelectric devices 16a, 16a', 16b, and 16b' to which alternating voltage is applied. When differential equations are set up for such models, the Formulas A and B result:

$$A: m_1(dx_1^2/dt^2) + c_1(dx_1/dt - dx_2/dt) + k_1(x_1 - x_2) = F$$
$$m_2(dx_2^2/dt^2) + c_1(dx_2/dt - dx_1/dt) + c_2(dx_2/dt) +$$
$$k_1(x_2 - x_1) + k_2 x_2 = -F$$

$$B: m_1(dx_1^2/dt^2) + c_1(dx_1/dt - dx_2/dt) + k_1(x_1 - x_2) = 0$$
$$m_2(dx_2^2/dt^2) + c_1(dx_2/dt - dx_1/dt) + c_2(dx_2/dt) +$$
$$k_1(x_2 - x_1) + k_2 x_2 = F$$

In both of these models, reaction force, that is, floor reaction force $F_R$ transmitted to the base 52 or the base 3 is found by the following Formula C:

$$F_R = c_2(dx_2/dt) + k_2 x_2 \qquad \text{C:}$$

Figure 6A:
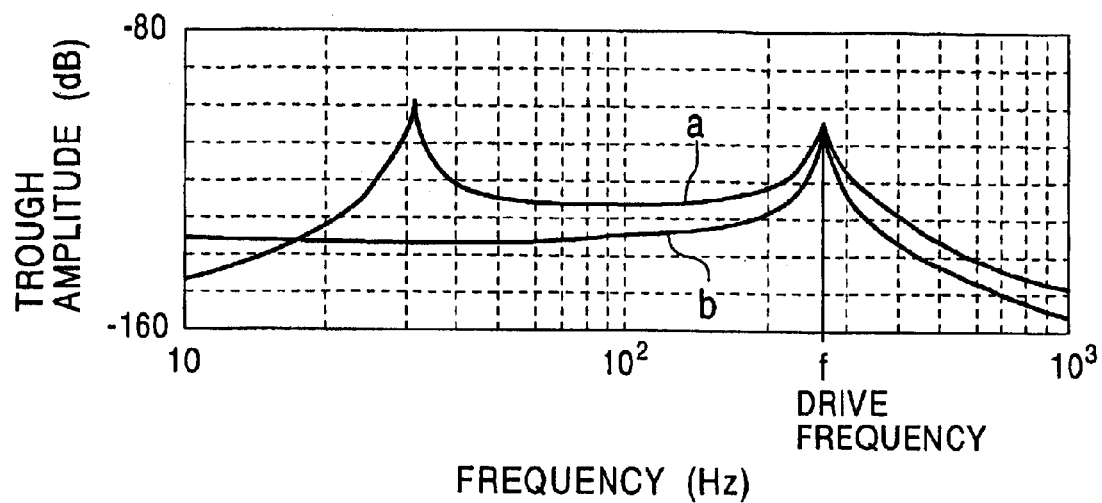
FIGS. 6A and 6B illustrate transfer functions of the vibratory system used in the first embodiment of the present invention and the vibratory system used in the second conventional example. More specifically.
Figure 6B:
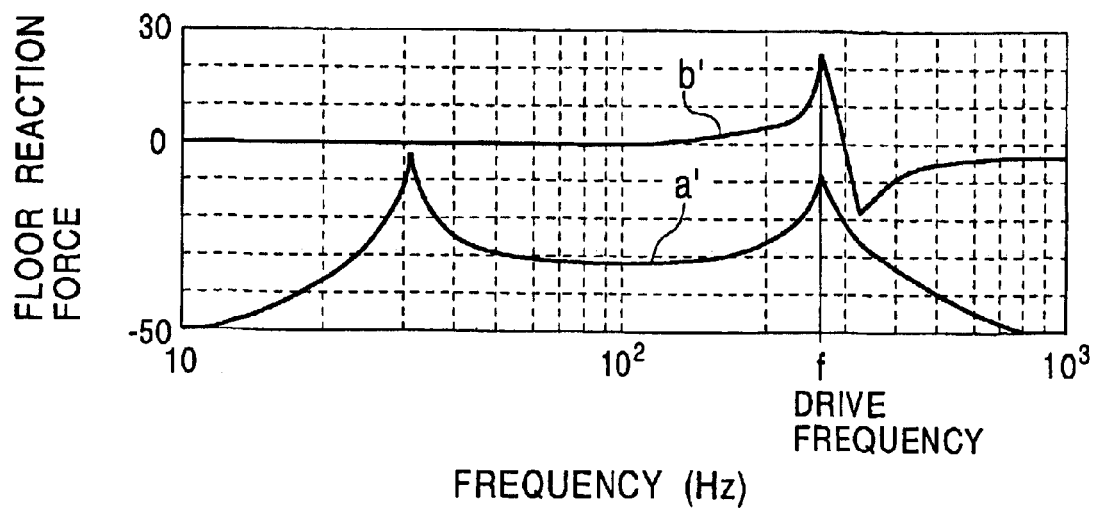
Figure 17:
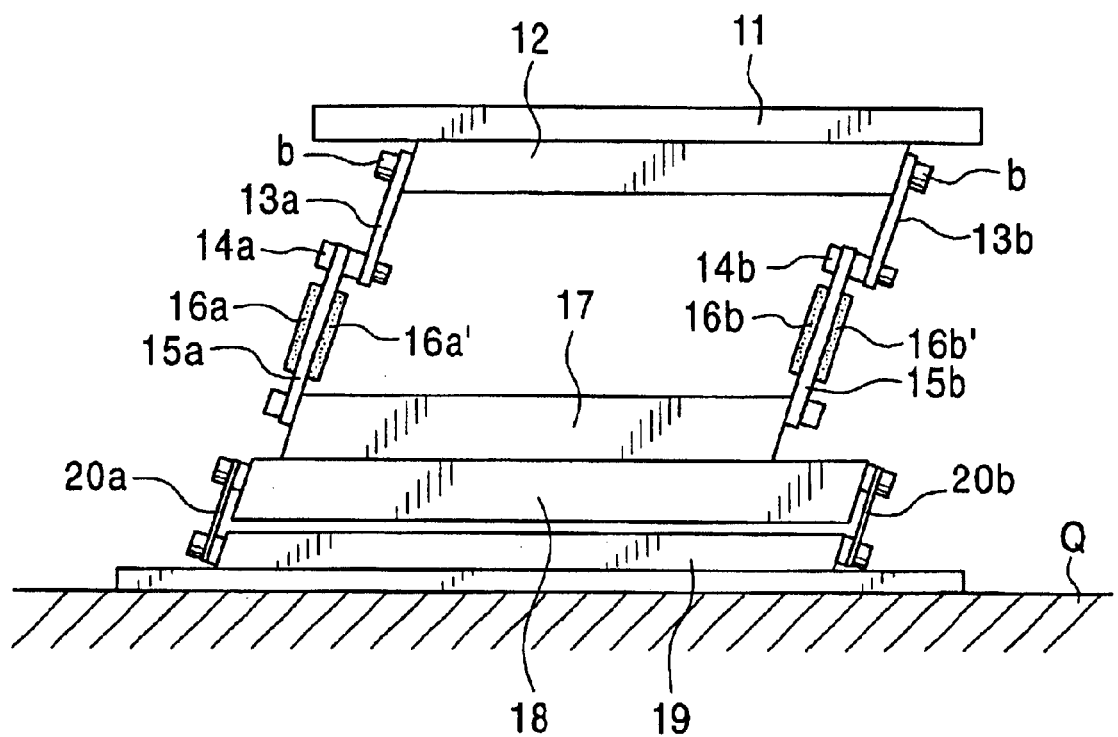
FIG. 17 is a front view schematically showing a third conventional example of a piezoelectric driven type vibratory feeder.

Simulation results obtained by solving this equation are shown in FIGS. 6A and 6B. FIG. 6A shows the relationship between trough amplitude (dB) and frequency (Hz) (that is, transfer function from the actuator F to the trough amplitude at each frequency). For the feeder of the embodiment of the present invention, the relationship changes as indicated by a. For the conventional feeder (FIG. 16), the relationship changes as indicated by b. At a drive frequency f, the trough amplitudes are the same. FIG. 6B shows the relationship between floor (base) reaction force and frequency (that is, transfer function from the actuator F to the floor reaction force at each frequency). At the same drive frequency f, the floor reaction force in the embodiment of the present invention is smaller by approximately 30 dB as shown by graphs a' and b'. Accordingly, in the embodiment of the present invention, the floor reaction force can be considerably reduced. The total height of the vibratory feeder is considerably smaller than the total height of the conventional vibratory feeder shown in FIG. 17. Therefore, for example, a much more suitable arrangement with peripheral devices and a considerably higher stability can be achieved. A block A is secured to the top surface of the opposing mass member 57. The block A is included in part of the mass $m_1$, and increases the weight of the entire opposing mass member 57. By this, it is possible to make the amplitude of the trough 51 larger than the amplitude of the opposing mass member 57. In other words, since $x_2 = m_1/m_2 \cdot x_1$ (which gives an approximate value), when $m_1$ is made large, the trough amplitude $x_2$ can be made large. In the above-described embodiment, by the detection output of the proximity sensor 69, the vibratory system is caused to vibrate in a resonance condition. However, without carrying out such a controlling operation, by using a voltage of a commercial power supply as it is, the vibratory system can be brought close to the resonance condition by adjusting this additional mass A.

Figure 2:
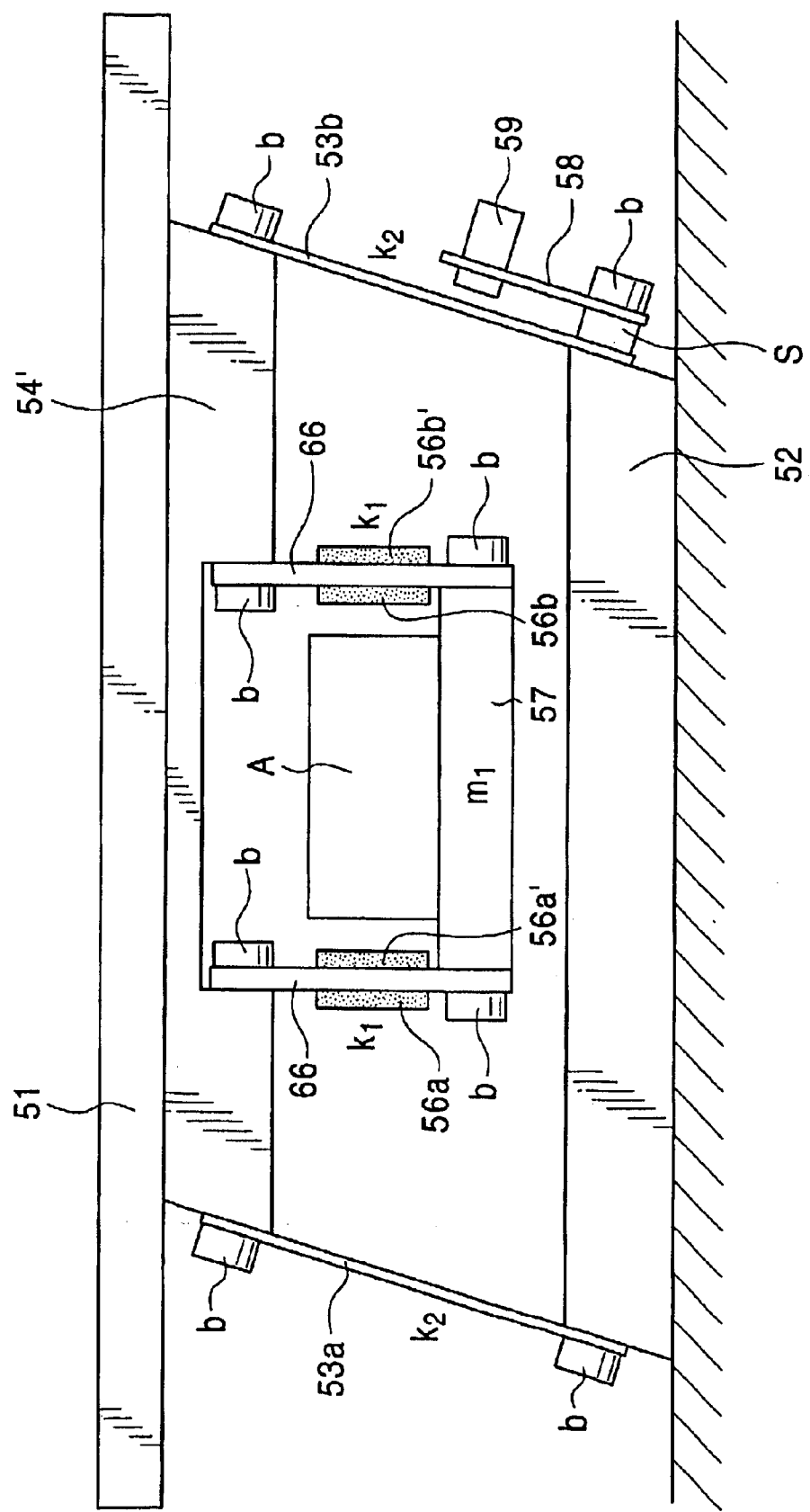
FIG. 2 is a front view schematically showing a piezoelectric driven type vibratory feeder of a second embodiment of the present invention.

FIG. 2 illustrates a piezoelectric driven type vibratory feeder of a second embodiment of the present invention. In this embodiment, driving flat plate springs 66 are vertically disposed. By bolts b, upper end portions of the driving flat plate springs 66 are secured to a vertical wall portion in a recess of a plate-spring-mounting block 54'. Other structural features are the same as those of the first embodiment. The feeder of the second embodiment operates in the same way and provides the same advantages. In the embodiment, the mounting of the driving plate springs 66 is simpler than the mounting in the first embodiment. In addition, the processing of the plate springs 66 is simple.

Figure 3:
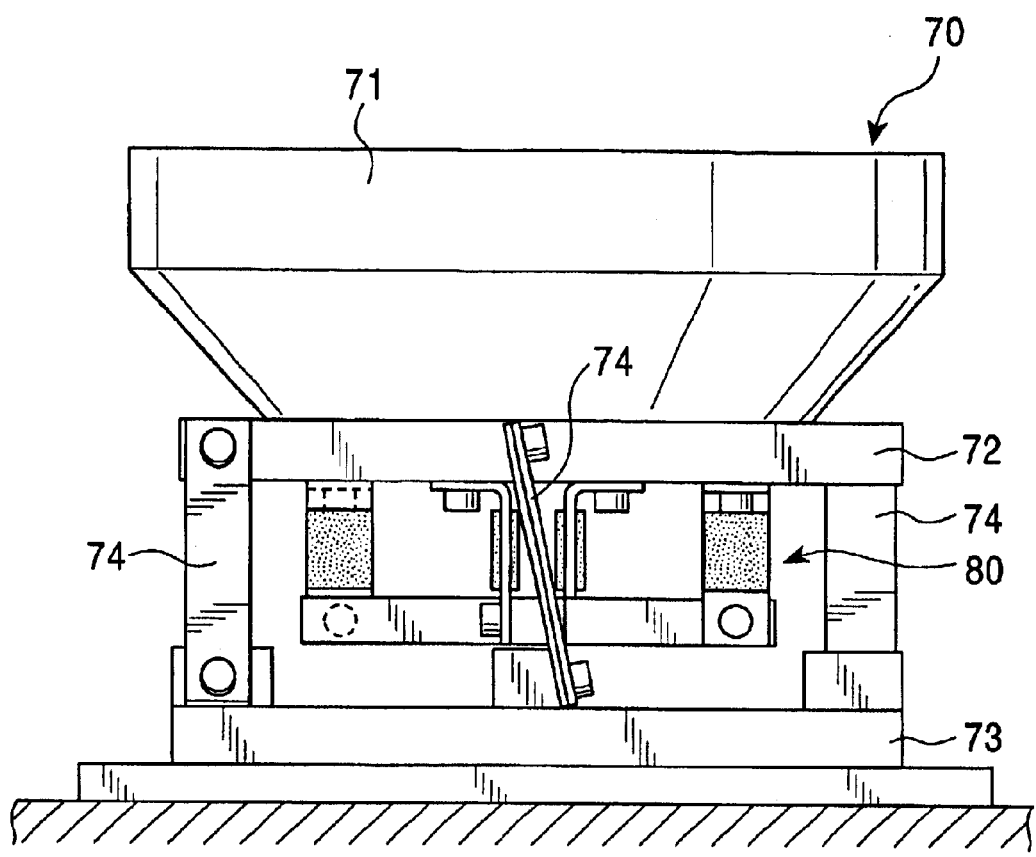
FIG. 3 is a front view schematically showing a piezoelectric driven type vibratory parts feeder of a third embodiment of the present invention.
Figure 4:
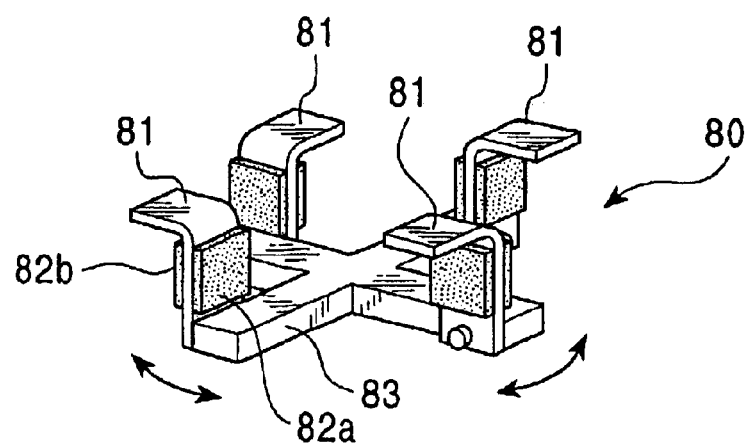
FIG. 4 is a perspective view of a drive portion of the piezoelectric driven type vibratory parts feeder of the third embodiment of the present invention.

FIG. 3 illustrates a piezoelectric driven type vibratory feeder 70 of a third embodiment of the present invention. The feeder is classified as what is called a vibratory parts feeder. As is conventionally known, a spiral track is formed in a bowl-shaped container (also called a bowl) 71. A plate-spring-mounting block 72 is secured to the bottom portion of the container 71. The block 72 is joined to a base 73 by four plate springs 74 having sufficiently small spring constants that are disposed at equiangular intervals (of 90 degrees in the embodiment). The plate springs 74 function as vibration-proof springs. A torsional vibration driving portion 80 related to the present invention is disposed below the plate-spring-mounting block 72. As illustrated in FIG. 4, the top end portions of substantially L-shaped cross section driving plate springs 81, disposed at equiangular intervals of 90 degrees, are secured to the plate-spring-mounting block 72 by bolts. A cross-shaped opposing mass member 83 is secured to the lower end portions of the driving plate springs 81. Piezoelectric devices 82a and 82b are bonded to both surfaces of each of the driving plate springs 81. As in FIG. 1, alternating voltage is applied to these piezoelectric devices 82a and piezoelectric devices 82b from the amplifier by a phase inversion of 180 degrees at both surfaces. In the embodiment, when alternating voltage is applied to the piezoelectric devices 82a and the piezoelectric devices 82b, the corresponding driving plate springs 81 bend, so that, by the plate springs 74 disposed at the outer peripheral sides thereof, the bowl 71 undergoes torsional vibration in a desired direction. By this, an object to be transported is smoothly transported along the spiral track inside the bowl 71.

Even in this embodiment, the common opposing mass member 83 is constructed so as to be secured to the lower end portions of the driving plate springs 81. Therefore, the bowl 71, which is a working mass member, does not undergo rotational motion caused by the rotation of two opposing mass members that occurs in the conventional examples, so that it does not undergo rotational motion in addition to torsional vibration. Therefore, by uniformly torsionally vibrating the bowl 71, an object to be transported is smoothly transported on the track inside the bowl 71. In addition, by the obliquely disposed plate springs 74 having small spring constants provided at the outer peripheral sides of the plate springs 81, vibration reaction force of the bowl 71 is prevented from being transmitted towards the base 73. The amplitude of the torsional vibration of the bowl 71 of the vibratory system and the reaction force transmitted to the base 73 are as shown in FIGS. 6A and 6B. It is possible to considerably reduce the floor reaction force compared to the floor reaction force in the conventional example. The height of this vibratory system can be greatly reduced compared to conventional cases where vibration is controlled by providing a few cylindrical rubber members below the base 73 or by disposing a coil spring.

Embodiments of the present invention have been described above. Obviously, the present invention is not limited to these embodiments, so that various modifications can be made based on the technical ideas of the present invention.

For example, although, in the above-described first and second embodiments, the driving plate springs 55a and 55b are vertically disposed, and the vibration-proof plate springs 53a and 53b are obliquely disposed, the driving plate springs 55a and 55b may be obliquely disposed, and the vibration-proof plate springs 53a and 53b may be vertically disposed.

Although, in the above-described embodiments, piezoelectric devices are bonded to both surfaces of each of the driving plate springs 55a and 55b, and alternating voltage is applied thereto by shifting the phases by 180 degrees, a piezoelectric device may be bonded to only one surface of each of the driving plate springs 55a and 55b. Obviously, the driving force is larger when the piezoelectric devices are bonded to both sides of each of the driving plate springs 55a and 55b. In addition, a plurality of piezoelectric devices may be bonded to one surface of each of the driving plate springs 55a and 55b.

Further, two or more piezoelectric devices may be bonded to one surface of each of the driving plate springs 55a and 55b. In this case, alternating voltages of the same phases are applied to the corresponding piezoelectric devices.

Although, in the first embodiment, a trough is given as an example of a working mass member, in addition to a working mass member which transports an object to be transported as described above, there may also be used in the present invention a working mass member which separates, by a screen provided in a tensioned state inside the trough, screening material supplied from an upper end at a screening upper portion and a screening lower portion while transporting the screening material on the screen.

Although, in the first embodiment, the proximity sensor 59 is disposed near the lower end portion of one of front and back vibration-proof plate springs 53a and 53b in order to cause the vibratory system to undergo resonant vibration based on the detection output from the proximity sensor 59, the proximity sensor 59 may be provided at other locations. For example, the proximity sensor 59 may be disposed close to the front vibration-proof plate spring 53a. In addition, by disposing the proximity sensor 59 close to the driving plate springs 55a or 55b or close to the trough 51 or the opposing mass member 57 so that the phase of the sensor output signal is not inverted, it is possible to cause the trough to undergo resonant vibration by the same control circuit.

Although, in the vibratory parts feeder of the third embodiment of the present invention, four obliquely provided vibration-proof plate springs 74 are disposed at intervals of 90 degrees, and four driving plate springs 81 are also correspondingly provided at intervals of 90 degrees, the number of plates springs 74 and the number of plate springs 81 are not limited to 4. Therefore, two, three, or five or more plate springs 74 and plate springs 81 may be used. In addition, the number of driving plate springs 81 does not have to be the same as the number of vibration-proof plate springs 74, so that the number of plate springs 81 may be larger or smaller than the number of vibration-proof plate springs 74.

Although, in each of the above-described embodiments, the vibratory system is driven at the resonance frequency by the detection output from the proximity sensor, the vibratory system does not have to be driven by such a controlling operation. The vibratory system may be driven by a commercial power supply. In this case, the additional mass A is adjusted so that the vibratory system virtually undergoes resonant vibration.

Even in the first embodiment, it is preferable to construct the feeder so that the total spring constant of the plate springs 53a and 53b is sufficiently smaller than the total spring constant of the plate springs 55a and 55b, and so that the plate springs 53a and 53b act as vibration-proof springs.

Like the feeder of the first embodiment, the feeder of the third embodiment may comprise alternating frequency controlling means and vibration detecting means for detecting any one of vibration displacement, velocity, and acceleration of either the bowl 71 or the opposing mass member 83. Here, the alternating frequency controlling means may be constructed so as to control the frequency of the alternating voltage applied to the piezoelectric devices 82a and the piezoelectric devices 82b so that bowl 71 undergoes resonant vibration at a natural frequency determined by the spring constants of the plate springs 74 and the mass of each mass member, based on a detection output from the vibration detecting means.

A description of second plate springs will now be given.

Figure 8:
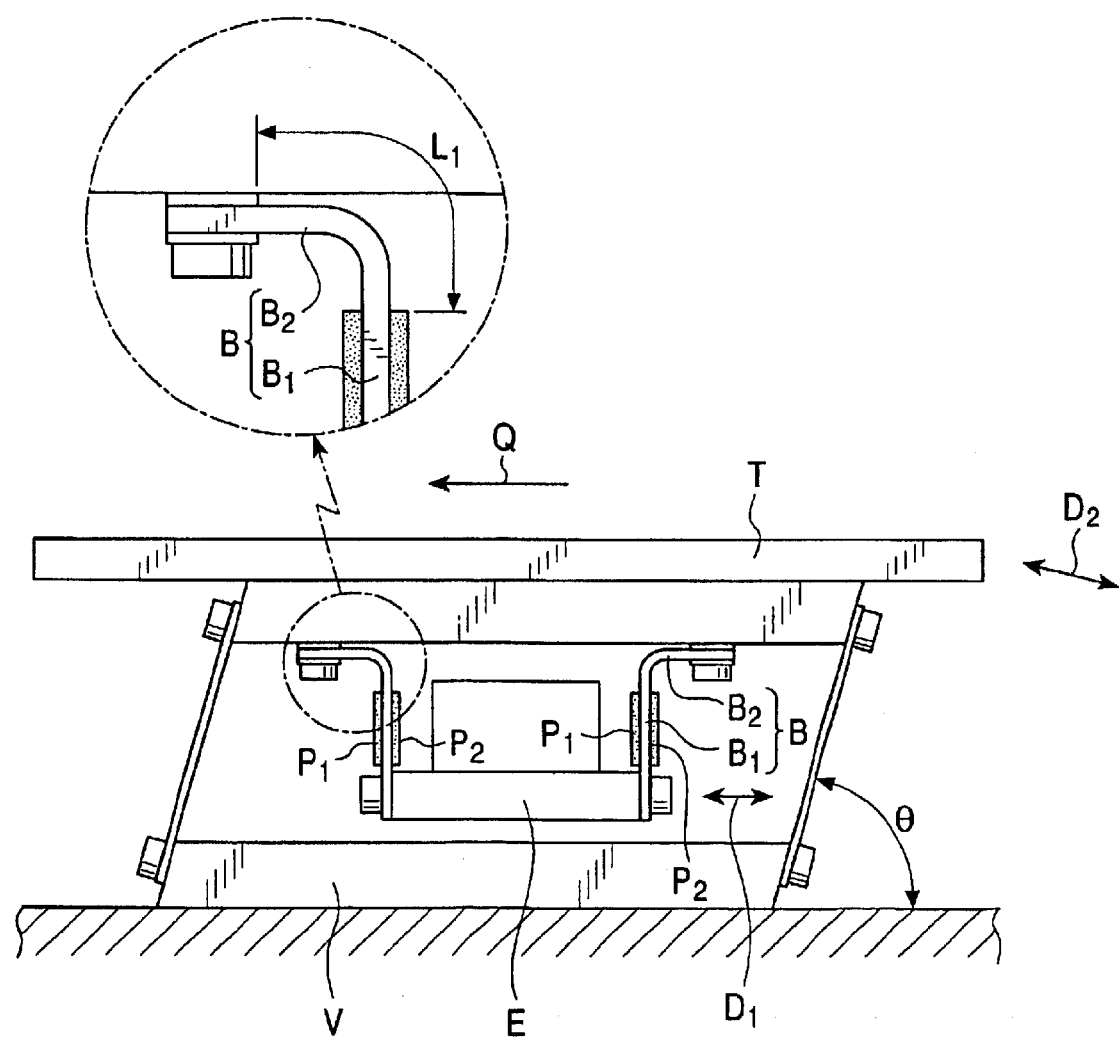
FIG. 8 illustrates an effective portion of each piezoelectric-device-bonding plate spring in the front view schematically showing the piezoelectric driven type vibratory feeder of the first embodiment of the present invention.
Figure 9:
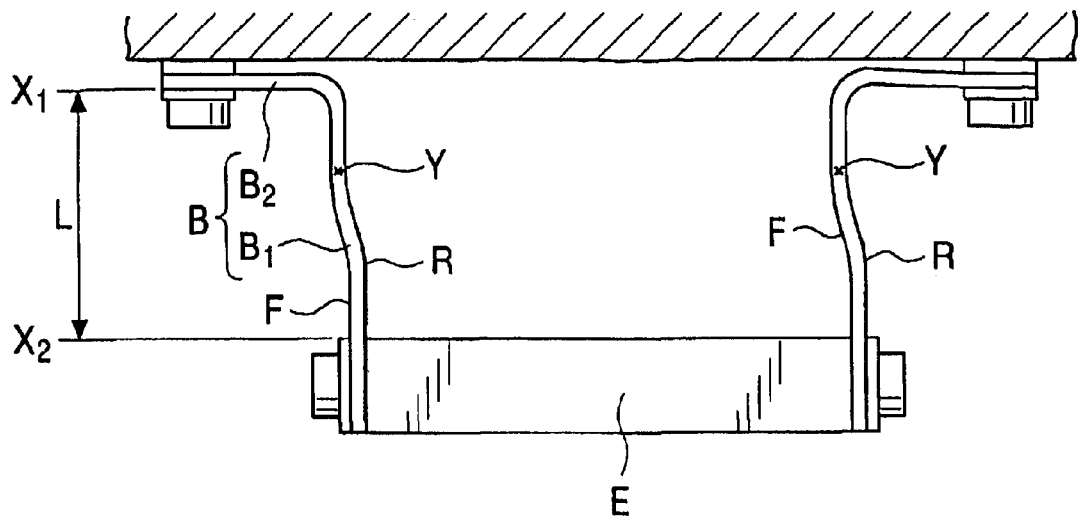
FIG. 9 illustrates in an exaggerated manner deflected shapes of a pair of front and back piezoelectric-device-bonding plate springs B.
Figure 10:
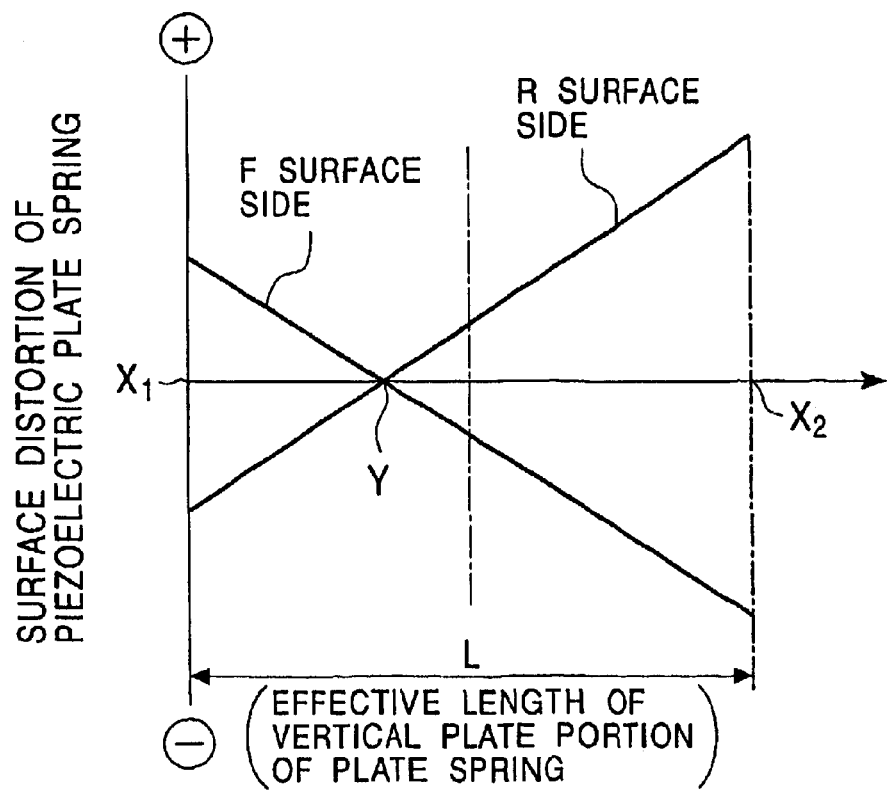
FIG. 10 is a graph showing surface distortions of both surfaces F and R of each effective length portion of each vertical plate portion $B_1$ of its corresponding piezoelectric-device-bonding plate spring B.

Since the second plate springs are plate springs to which piezoelectric devices are bonded, the second plate springs will hereunder be called piezoelectric-device-bonding bonding plate springs. FIG. 8 is a front view schematically showing the piezoelectric driven type vibratory feeder of the first embodiment of the present invention. FIG. 9 illustrates in an exaggerated manner deflected shapes of a pair of front and back piezoelectric-device-bonding plate springs B. FIG. 10 is a graph showing surface distortions of both surfaces F and R of each effective length portion of each vertical plate portion $B_1$ of its corresponding piezoelectric-device-bonding plate spring B.

In the piezoelectric driven type vibratory feeder shown in FIG. 8, each piezoelectric-device-bonding plate spring B has what is called an L shape formed by bending each plate spring B substantially vertically.

Here, with the front and back end surfaces of an opposing mass member E being interposed between the plate springs B, the pair of piezoelectric-device-bonding plate springs B suspended from the bottom surface of a trough T are such that their corresponding horizontal plate portions $B_2$ are secured to the bottom surface of the trough T. As shown in FIG. 9, the horizontal plate portions $B_2$, as well as the vertical plate portions $B_1$, are integrally deformed by being deflected. Therefore, as shown in FIGS. 9 and 10, inflection points Y of the vertical plate portions $B_1$ of the corresponding piezoelectric-device-bonding plate springs B are displaced upward from the center portions of the vertical plate portions $B_1$ in the height direction thereof.

As a result, since piezoelectric devices $P_1$ and piezoelectric devices $P_2$ can be bonded above the center portions of the vertical plate portions $B_1$ of the corresponding piezoelectric-device-bonding plate springs B in the height direction thereof, and since the horizontal plate portions $B_2$ also act as effective portions of the plate springs B because the horizontal plate portions $B_2$ of the piezoelectric-device-bonding plate springs B are deformed by being deflected, the effective portions of the plate springs B become long, so that the real lengths (represented by $L_1$ in FIG. 8) of portions of the effective portions where the piezoelectric devices $P_1$ and $P_2$ are not bonded become large, thereby making it easier for the piezoelectric-device-bonding plate springs B to deform. Therefore, compared to conventional flat piezoelectric-device-bonding plate springs, the displacements of the lower end portions of the vertical plate portions $B_1$ can be made large, and, without making the height of the feeder large, the amplitude of the trough can be made large, so that parts transportation capability of the feeder is increased.

Figure 11A:
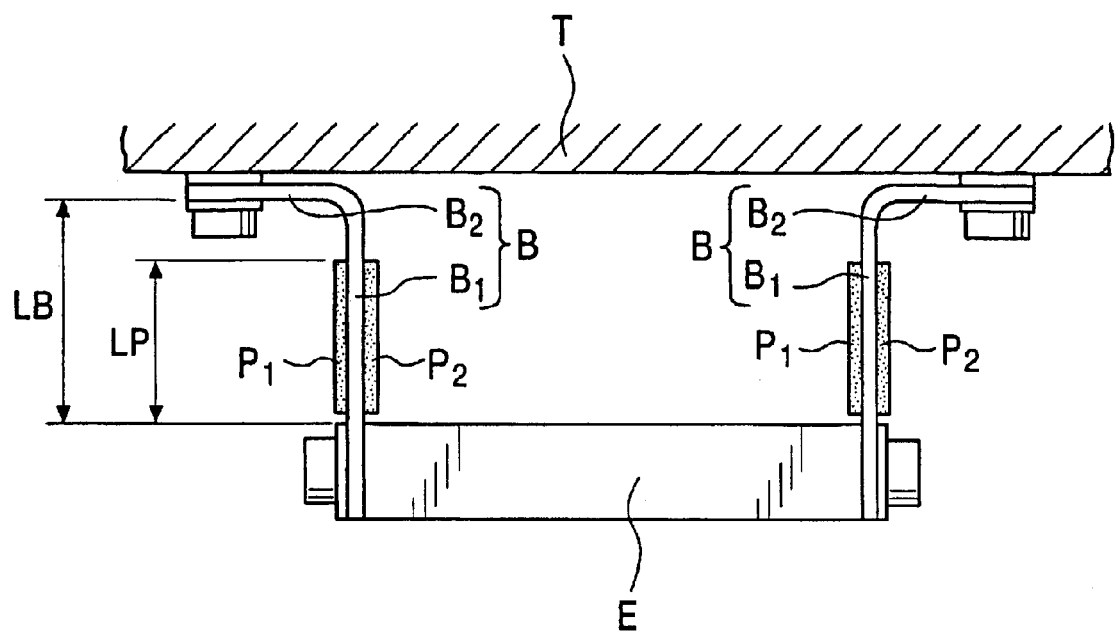
FIG. 11A schematically shows a state in which an opposing mass member E is mounted to the bottom surface of a trough T through a pair of L-shaped piezoelectric-device-mounting plate springs B, with each plate spring B including a vertical plate portion $B_1$ with an effective length LB.
Figure 11B:
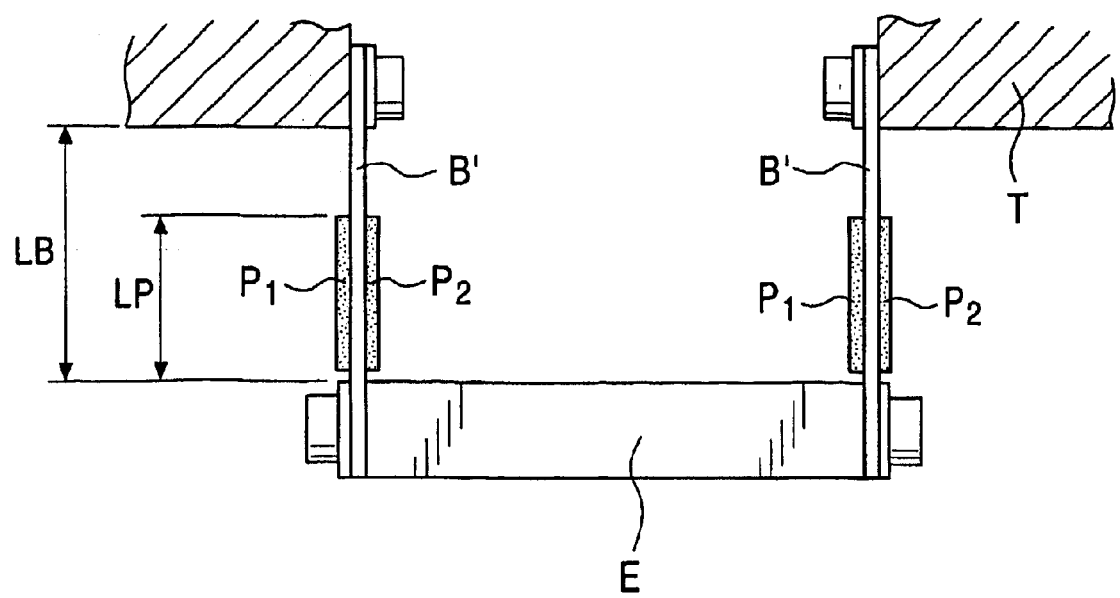
FIG. 11B schematically shows a state in which the opposing mass member E is mounted to the bottom surface of the trough T through a pair of flat piezoelectric-device-bonding plate springs B', with each plate spring similarly including a vertical plate portion $B_1$ with an effective length LB.
Figure 12:
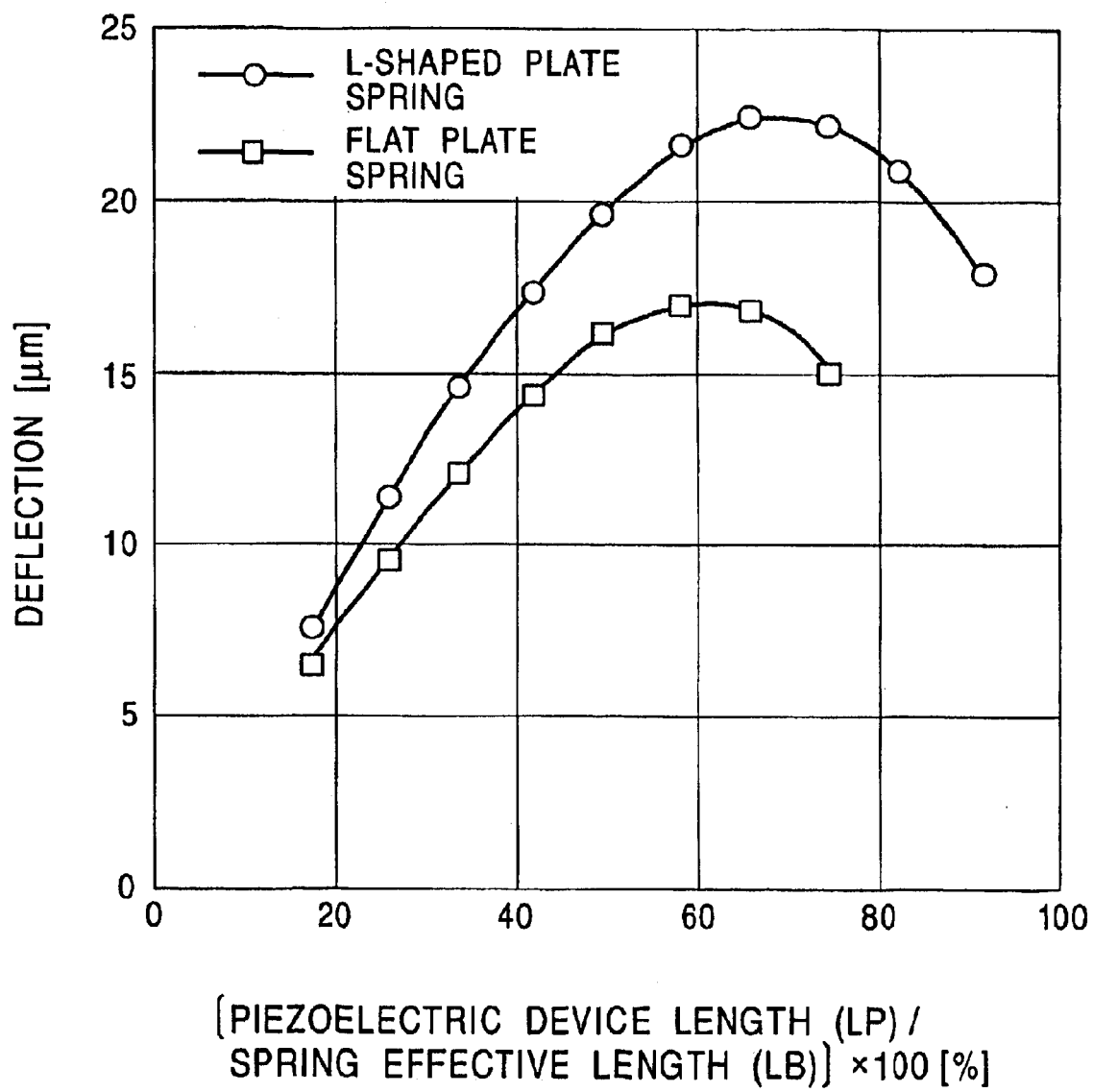
FIG. 12 is a graph showing changes in deflection of each L-shaped plate spring B and each flat plate spring B' for bonding piezoelectric devices thereto with respect to [piezoelectric device length (LP)/spring effective length (LB)].

In order to confirm the operational effects of the present invention, changes in deflection of the opposing mass member E are illustrated in FIG. 12 when, as shown in FIGS. 11A and 11B, effective lengths LB of the vertical plate portions $B_1$ of the L-shaped piezoelectric-device-bonding plate springs B and effective lengths LB of flat piezoelectric-device-bonding plate springs B' are equal to each other, and effective lengths LP of the same piezoelectric devices $P_1$ and $P_2$ bonded to both surfaces of their corresponding plate springs B and B' are variously changed. The piezoelectric devices $P_1$ and the piezoelectric devices $P_2$ are bonded to the lower end sides of the vertical effective portions of their corresponding piezoelectric-device-bonding plate springs B and B', and applied voltages are constant in all states.

As is clear from FIG. 12, the maximum deflection of each conventionally used flat plate spring B' occurs when the ratio of its corresponding piezoelectric device length (LP) to the effective length (LB) of each flat plate spring B' is approximately 60%. On the other hand, the maximum deflection of each L-shaped plate spring B used in the present invention occurs when the ratio is approximately 70%. Therefore, it has been found that, when the L-shaped plate springs B used in the present invention are used, the inflection points of the vertical plate portions are displaced upward compared to the inflection points of the conventionally used plate springs B'. In addition, it has been found that, the deflection amounts of the L-shaped plate springs B used in the present invention become 2 to 4 times greater than the deflection amounts of the conventionally used plate springs B', so that, when the feeders have the same heights, the plate springs B can be efficiently displaced by large amounts.

The piezoelectric-device-bonding plate springs of the feeder of the present invention are constructed so that the horizontal plate portions, in addition to the vertical plate portions, function as effective length portions of the springs. Therefore, the spring constants of the plate springs can be adjusted in a larger number of ways. The spring effective portions are portions of the springs that can be elastically deformed. In general, the spring constant is inversely proportional to the third power of the length of an effective portion. Therefore, when an effective portion is long, the spring constant becomes small. On the other hand, when an effective portion is short, the spring constant becomes large.

Figure 13A:
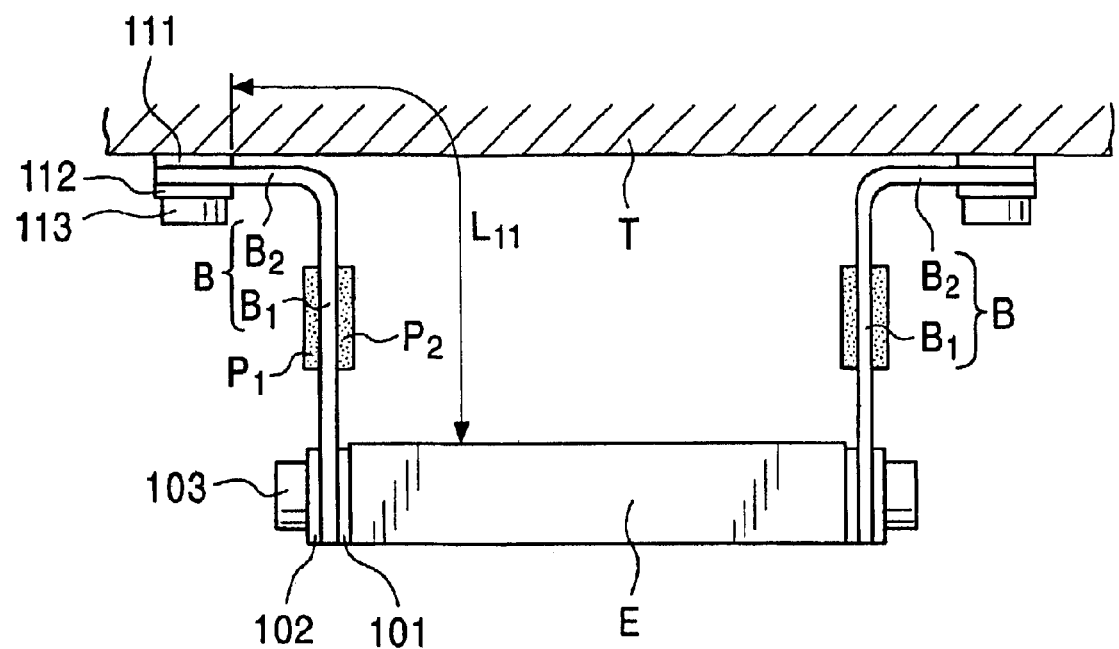
FIGS. 13A and 13B illustrate states in which the spring effective lengths have been changed by changing the lengths of a spacer 101 and a spring presser plate 102 and of a spacer 111 and a spring presser plate 112 that secure each of the L-shaped piezoelectric-device-bonding plate springs B to the opposing mass member E and the trough T.
Figure 13B:
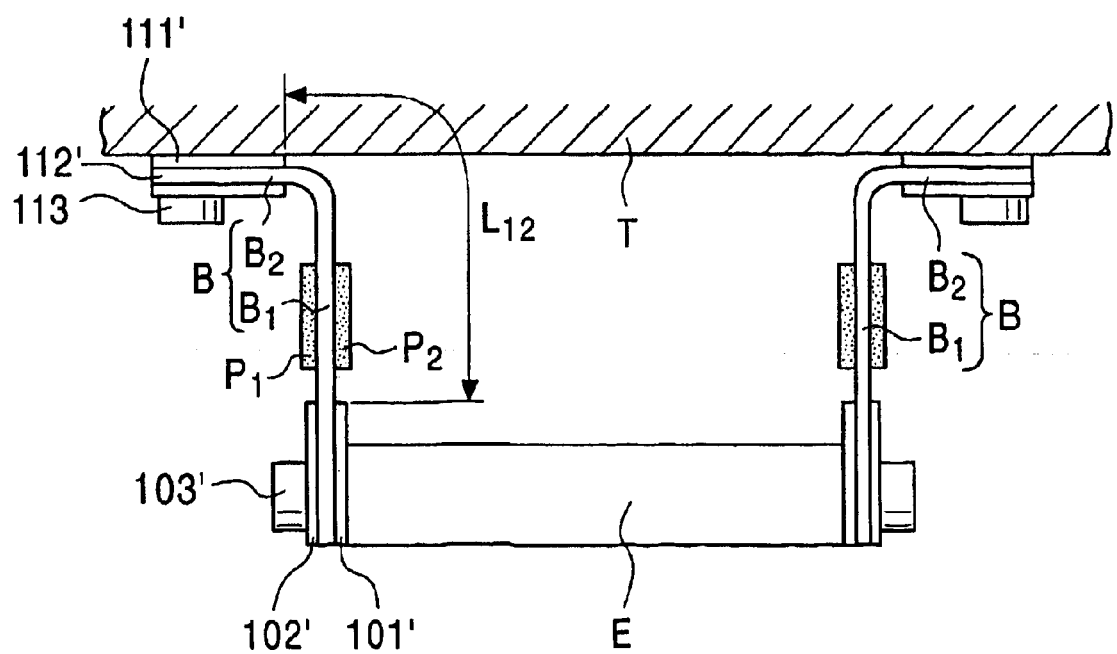

As shown in FIG. 13A, spacers 101 are disposed between the vertical plate portions $B_1$ of the corresponding L-shaped piezoelectric-device-bonding plate springs B and end surfaces of a vibration weight E, and spring presser plates 102 are disposed outwardly of the corresponding vertical plate portions $B_1$. These are secured to the vibration weight E by bolts 103. Spacers 111 are disposed between the bottom surface of the trough T and the corresponding horizontal plate portions $B_2$ of the piezoelectric-device-bonding plate springs B, and spring presser plates 112 are disposed outwardly of the horizontal plate portions $B_2$. These are secured to the bottom surface of the trough T by bolts 113. Accordingly, in order to increase the spring constants of the piezoelectric-device-bonding plate springs B, as shown in FIG. 13B, either one or both of the spacer 101 and the spring presser plate 102 and either one or both of the spacer 111 and the spring presser plate 112 are made long. (In FIG. 13B, spacers and spring presser plates made longer than the spacers 101 and 111 and the spring presser plates 102 and 112 in FIG. 13A are labeled 101' and 111' and 102' and 112', respectively.) FIG. 13B shows the case where both of the spacer 101' and the spring presser plate 102' and both of the spacer 111' and the spring presser plate 112' are made longer. By this, the effective length of each piezoelectric-device-bonding plate spring B which is $L_{11}$ in FIG. 13A becomes smaller or equal to $L_{12}$ in FIG. 13B. As mentioned above, the inflection point Y of each vertical plate portion $B_1$ of its corresponding L-shaped piezoelectric-device-bonding plate spring B is displaced upward from the center portion of each vertical plate portion $B_1$ in the height direction thereof, so that the above-described adjustments can be easily carried out even at the side of the opposing mass member E.

Figure 14A:
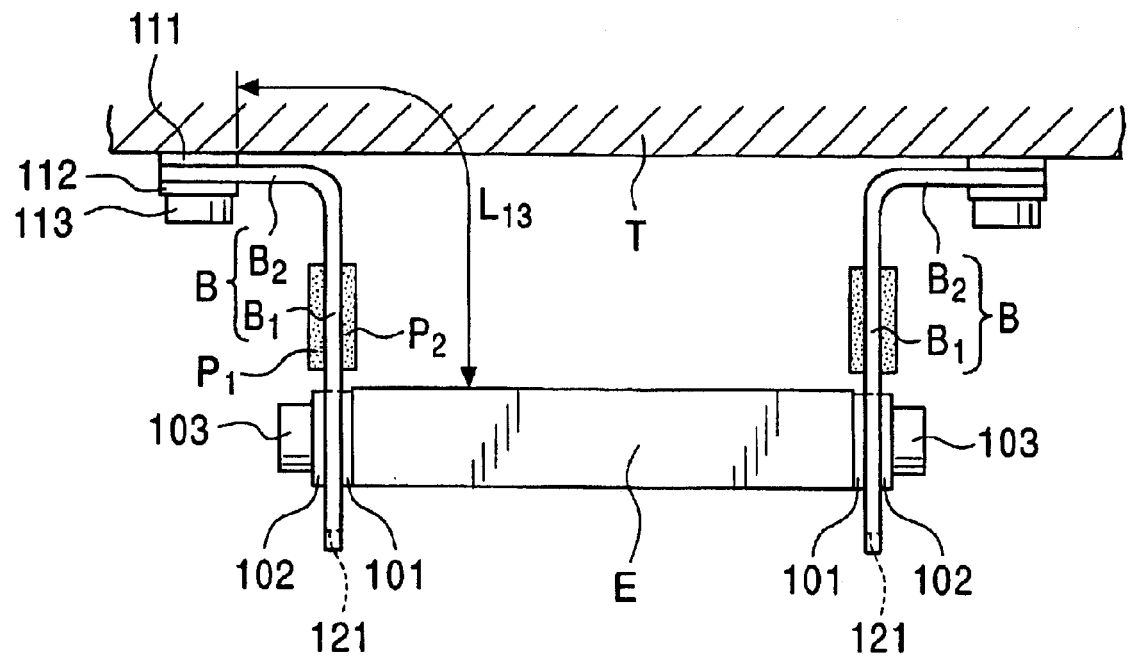
FIGS. 14A and 14B are a front view and a side view of an example of changing the spring effective lengths by using slots 121 formed in the vertical plate portions $B_1$ of the piezoelectric-device-bonding plate springs B.
Figure 14B:
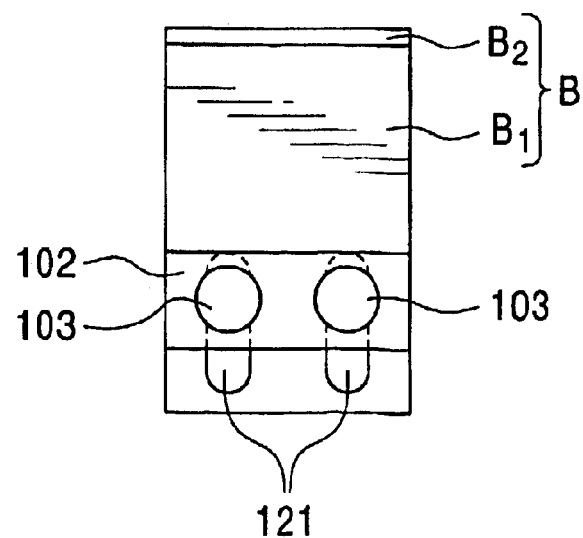
Figure 15:
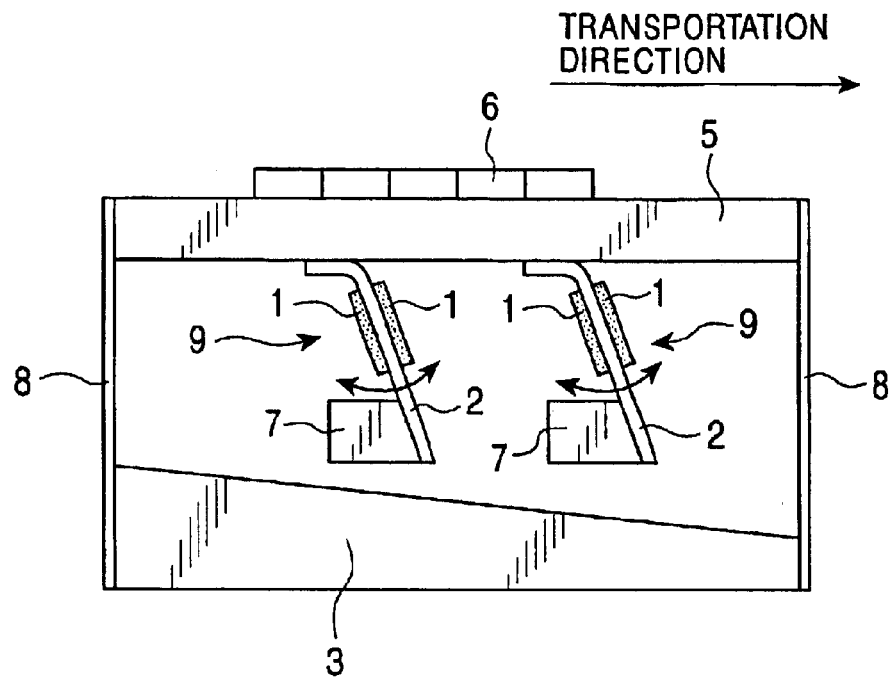
FIG. 15 is a front view schematically showing a first conventional example of a piezoelectric driven type vibratory feeder.

FIGS. 14A and 14B show another example, in which vertical slots 121 are formed in the lower end of each vertical plate portion $B_1$ of its corresponding L-shaped piezoelectric-device-bonding plate spring B, so that, by the slots 121, the securing position of each vertical plate portion $B_1$ with respect to the vibration weight E can be adjusted. In the example shown in FIGS. 14A and 14B, each vertical plate portion $B_1$ of its corresponding piezoelectric-device-bonding plate spring B is secured to the opposing mass member E, at the top end side of the slots 121. Therefore, the effective length becomes equal to $L_{13}$, which is smaller than the effective length $L_{11}$ of each piezoelectric-device-bonding plate spring B in FIG. 13A, so that each spring constant is increased.

Consequently, in the case where the length of each vertical plate portion $B_1$ of its corresponding piezoelectric-device-bonding plate spring B is constant, when, in relation to each member around the driving plate springs A, etc., the ratios between the lengths of the horizontal plate portions $B_2$ and the lengths of the corresponding vertical plate portions $B_1$ are made as large as possible, as mentioned above the horizontal plate portions $B_2$ are deflected by a larger amount in addition to the spring constants becoming smaller, so that the amplitude of the trough becomes larger, and, without increasing the height of the feeder, the transportation capability thereof is increased.

What is claimed is:

1. A piezoelectric driven type vibratory feeder comprising:
    a base;
    a plurality of first plate springs, with a lower end portion of each of said plurality of first plate springs being secured to the base;
    a working mass member connected to an upper end portion of each of said plurality of first plate springs, said working mass member being supported at said base so that said working mass member can vibrate;

a plurality of second plate springs, with an upper end portion of each of said plurality of second plate springs being secured to said working mass member;

a single opposing mass member, with a lower end portion of each of said plurality of second plate springs being connected to said single opposing mass member;

a piezoelectric device bonded to at least one surface of each of said plurality of second plate springs; and alternating voltage applying means for applying alternating voltage to each piezoelectric device;

wherein, by applying the alternating voltage to said piezoelectric device, each of said plurality of second plate springs undergoes bending vibration, causing said working mass member to vibrate by the bending vibration, so that an object is transported on said working mass member.

2. The piezoelectric driven type vibratory feeder according to claim 1, wherein a total spring constant of said plurality of first plate springs is sufficiently smaller than a total spring constant of said plurality of second plate springs, and wherein each of said plurality of first plate springs acts as a vibration-proof spring.

3. The piezoelectric driven type vibratory feeder according to claim 1, wherein each of said plurality of second plate springs is disposed substantially perpendicular to an object transportation surface of said working mass member.

4. The piezoelectric driven type vibratory feeder according to claim 1, wherein each of said first plate springs is disposed so as to be tilted at a predetermined angle from a direction in which the object is transported.

5. The piezoelectric driven type vibratory feeder according to claim 1, further comprising vibration detecting means for detecting any one of vibration displacement, velocity, and acceleration of either said working mass member or said opposing mass member; and alternating frequency controlling means for controlling a frequency of the alternating voltage applied to each of said piezoelectric device so that said working mass member undergoes resonant vibration at a natural frequency determined by masses of said working mass member and said opposing mass member and a spring constant of said plurality of second plate springs.

6. The piezoelectric driven type vibratory feeder according to claim 5, wherein said vibration detecting means is a proximity sensor disposed near one of said plurality of first plate springs or one of said plurality of second plate springs.

7. The piezoelectric driven type vibratory feeder according to claim 1, wherein each of said plurality of first plate springs and each of said plurality of second plate springs form a pair of front and back plate springs.

8. The piezoelectric driven type vibratory feeder according to claim 7, wherein said working mass member is a linear trough.

9. The piezoelectric driven type vibratory feeder according to claim 1, wherein said plurality of first plate springs are disposed at equiangular intervals, wherein said plurality of second plate springs are disposed at equiangular intervals, wherein said working mass member is supported so as to be capable of undergoing torsional vibration, and wherein, by the torsional vibration of said working mass member, the object is transported on said working mass member.

10. The piezoelectric driven type vibratory feeder according to claim 9, wherein said working mass member is a bowl-shaped container with a spiral track.

11. The piezoelectric driven type vibratory feeder according to claim 1, wherein each of said plurality of second plate springs has a shape formed by bending a portion thereof substantially perpendicularly, and wherein each of said plurality of second plate springs includes a substantially vertical portion and a substantially parallel portion with respect to an object transportation surface of said working mass member, with each substantially parallel portion being secured to a bottom surface of said working mass member.

12. The piezoelectric driven type vibratory feeder according to claim 11, wherein said piezoelectric device is bonded to only a side opposite to said working mass member with respect to an inflection point of each of said plurality of second plate springs.

13. The piezoelectric driven type vibratory feeder according to claim 11, further comprising spring constant adjusting means for adjusting a spring constant of each of said plurality of second plate springs.

14. The piezoelectric driven type vibratory feeder according to claim 13, wherein said spring constant adjusting means comprises a spacer and a spring presser plate, and changes an effective length of each of said plurality of second plate springs at at least one of a working-mass-member side and an opposing-mass-member side.

15. The piezoelectric driven type vibratory feeder according to claim 13, wherein said spring constant adjusting means is constructed so as to make variable a position of securing said opposing mass member to each of said plurality of second plate springs by a slot formed in an end portion of each of said plurality of second plate springs.

* * * * *